…

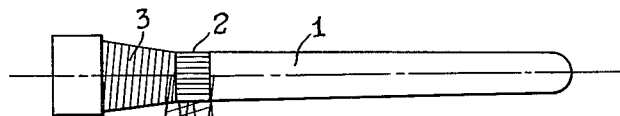
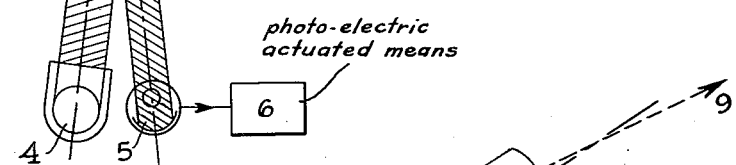
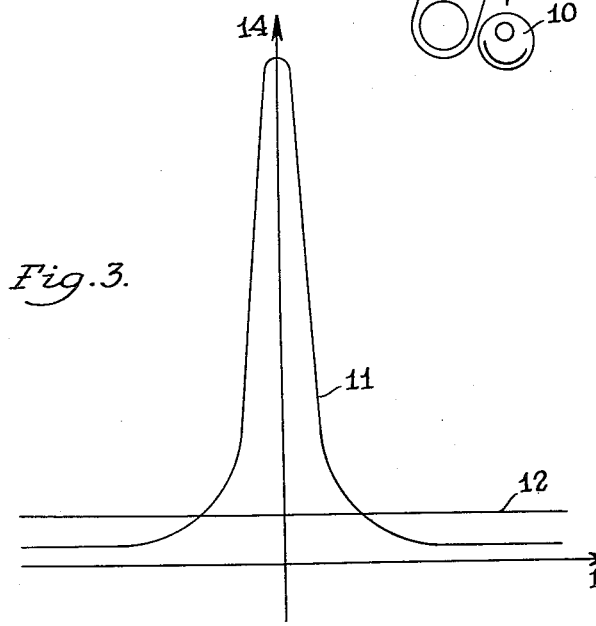

United States Patent Office 3,053,137
Patented Sept. 11, 1962

3,053,137
ELECTRO-OPTICAL APPARATUS FOR SENSING IN COUNTING, REGULATING, AND CONTROL SYSTEMS
Erich Loepfe, Zurich, Switzerland, assignor to Aktiengesellschaft Gebruder Loepfe, Zurich, Switzerland
Filed May 18, 1956, Ser. No. 591,005
2 Claims. (Cl. 88—14)

The present invention relates to an electro-optical apparatus for sensing in counting, regulating, and control systems or the like. The apparatus is based on the well known principle of modulating the intensity of a beam of light in such manner that a beam emanating from a source is reflected by the sensed object into a photo-electric cell. The beam is therefore used as a vehicle for conveying the information whereas the information itself is embodied in the intensity of the beam.

It is known that the characterisation of positive or negative conditions, or of a certain object or a particular part thereof and so forth, can be effected by differentiation of the object from its environment by means of brighter or darker colouration. Characterisation is therefore based upon differences in the coefficient of diffuse reflection. When the sensing beam passes across the object the light and dark modulation of the reflected rays produces a corresponding response in a photo-electric cell and this may be used for the control of switching arrangements.

However, an arrangement of this kind suffers from the disadvantage that the effective intensity of the light is very small because the sensing beam is diffusively reflected within a solid angle of 180° so that a very small proportion actually enters the photo cell. Comparatively weak external sources of light such as electric lamps, windows, etc. have a sufficient intensity to produce an interference background which owing to its changeable nature must be continually compensated. Moreover, the equipment readily reacts to false optical signals because the environment of the sensed object may be capable of equally effective diffuse reflection or absorption as the object itself.

An alternative apparatus makes use of reflection by mirrors the object being characterised by means of a polished metal surface or a glass mirror. Although this method greatly increases effective intensity by comparison with diffuse reflection it suffers from the disadvantage of requiring source, photo cell, and reflecting element to be disposed in accurate relative geometrical positions. This means that the equipment must be of precision manufacture and correspondingly expensive, and if the conformation of the objects themselves is subject to considerable tolerations the method fails altogether. If the special shape of the object calls for the use of a curved reflecting surface, the sensing beam must be a narrow pencil to avoid appreciable divergence of the reflected rays. Frequently, in such cases, plane mirrors cannot be used because the symmetry of a body of revolution would be thereby upset.

An attempt has been made to replace the single environmentally differentiated reflecting element by a plurality of such elements. This produces a pattern of alternately reflecting and absorbing elements. Sensing can then be performed by two methods, either by simultaneously sensing all the elements, a separate combination of source and photo cell being available for each element of the pattern and the output circuits of the photo cells being coupled by means of a coincidence system which transmits a pulse only when there is a simultaneous response from all the cells, or, alternatively, by the elements being scanned in succession by a single cell, the individual pulses being integrated and the sequence frequency at the same time filtered by electrical or mechanical means. Both methods are based on the same idea, namely that the product of several probabilities must be smaller and at most equal to any individual factor of the product. For if a certain probability is assumed for the occurrence of a false pulse relating to an individual element, then the product of the probabilities relating to a plurality of elements must of necessity be smaller than any one of the individual probabilities all of which are smaller than one.

Both methods, i.e. the coincidence and the integration methods, suffer from the disadvantage that they introduce considerable complications by comparison with the single element system and that the much greater superficial area of the pattern renders its characterisation less precise. Moreover, when using the integration method advantage cannot be taken of the stability and reliability of Kipp relay or flip-flop electronics which must be replaced by the less stable method of using a characteristic with adjustable threshold value. Moreover, response depends upon the scanning speed. If the sequence filter is to be effective (i.e. not subject to much damping) the required velocity must be confined to narrow limits.

According to the present invention a method of scanning permitting the retention of Kipp relay circuits which are unaffected by scanning speeds and have sufficient discriminating power to ensure a high margin of safety in regard to all possible tolerances even when single element systems are used, consists in utilising a substance for characterisation which produces ray reversing reflection.

It is the property of such a substance that it reflects all rays of any incidence approximately in the angle of incidence (unlike normal reflection in which the reflected ray is symmetrical to the incident ray in relation to the normal at the point of incidence). Ray reversing reflection is therefore auto-collimating. Every ray is reflected in the direction of incidence irrespectively as to the particular angular position of the reflecting element. In other words curved surfaces act as if they were "plane mirrors."

Known substances of this kind are katadioptric reflectors consisting of a transparent base with similarly transparent mainly spherical occlusions of considerably different refractive index. They may be applied to the surface that is to be characterised in the form of films, coatings, or the like, or alternatively they may be contained in the material whereof the body is made.

The invention will appear more clearly from the following detailed description when taken in connection with the accompanying drawing showing, by way of example, preferred embodiments of the inventive idea.

In the drawing:

FIGURE 1 is a diagrammatic side view showing a bobbin feeler provided with a katadioptric reflector according to the present invention.

FIGURE 2 is a diagrammatic perspective view illustrating means for preventing false reflections.

FIGURE 3 is a diagram illustrating the intensity of ray reversing reflection and usual diffused reflection as a function of the angle of incidence.

An illustrative example is shown in FIGURE 1 which represents a weft bobbin feeler for looms. The problem in this case is to stop the loom or to trip an automatic bobbin changing device before the bobbin has run empty. For this purpose the stem of the bobbin 1 is provided with a ring 2 of a ray reversing substance in such manner that the ring is uncovered as the thread gradually unwinds but before the last remainder of thread 3 has been used. The beam emitted by the source 4 is diffusely reflected by the wound bobbin but before the bobbin is completely empty the greater proportion of the beam will be reflected by the ring 2 in the direction of the source and hence also in the direction of the photo cell 5 mounted in close proximity to the source. The photo cell then trips the necessary circuits to stop the loom or to entrain the automatic bobbin changing motion. FIGURE 1 shows the light-receiving means combined with the photo cell 5 and the actuated means 6 connected with the photo cell 5. Since the angular position of the reflecting element does not affect the angle of reflection of the incident ray the rotational symmetry of the spool can be retained without impairing the intensity of the reflected beam and without necessitating the use of a very sharp sensing pencil and hyper-critical adjustment of the components. False reflections caused by extremely bright weft threads can be readily rendered innocuous as shown in FIGURE 2 by displacing the point of incidence of the sensing beam 7 out of the meridional line 8 so that it falls a little above or a little below it and by selecting an angle of incidence other than the perpendicular to the bobbin axis. Since the wound bobbin reflects according to the normal laws of reflection any ray 9 reflected by the bobbin, so long as it carries a winding of thread, will then certainly not be reflected into the photo cell 10.

In FIGURE 3 the curve 11 represents the distribution of intensity in the case of ray reversing reflection whereas 12 shows the distribution of intensity in normal diffuse reflection. The angles on either side of the incident ray are plotted on the abscissa 13 whereas the reflected intensities are marked off on the ordinate 14. The graph shows that in order to get well clear of the diffuse background 12 a stop must be used that leaves only a very small angle of vergence or, as shown in FIGURE 1, source and photo cell must be placed very closely together. Experience shows that the discriminating differential in the case of the best ray reversing substances available today (which may be defined as the intensity ratio between a substantially 100% diffuse reflection and a katadioptric reflector for infinitely small vergence angles) is something like 1:40. In practice, when observing the requirements hereinbefore explained, a finite vergence will produce a ratio that is always in excess of 1:8 so that Kipp-relay i.e. flip-flop circuits will afford a considerable margin of safety even after allowing for all tolerations.

What is claimed is:

1. In counting, regulating and control systems and the like, an electro-optical apparatus for sensing an object, said apparatus comprising, a katadioptric reflector carried by said object, said object having normally light-reflecting surfaces located adjacent said katadioptric reflector, means projecting a ray of light at an acute angle upon said katadioptric reflector, means located in the path of light reflected by said katadioptric reflector and outside of the path of light reflected by said surfaces for receiving the light reflected by said katadioptric reflector, and photoelectric actuated means operatively connected with the light-receiving means.

2. In counting, regulating and control systems and the like, an electro-optical apparatus for sensing an object, said apparatus comprising, a katadioptric reflector carried by said object, means projecting a ray of light at an acute angle upon said katadioptric reflector, said object having normally light-reflecting surfaces temporarily located between said katadioptric reflector and said light-projecting means, means located in the path of light reflected by said katadioptric reflector and outside of the path of light reflected by said surfaces for receiving the light reflected by said katadioptric reflector, and photo-electric actuated means operatively connected with the light-receiving means.

References Cited in the file of this patent

UNITED STATES PATENTS

| | | |
|---|---|---|
| 2,026,149 | Turner | Dec. 13, 1935 |
| 2,432,793 | Payne | Dec. 16, 1947 |
| 2,522,101 | Dion et al. | Sept. 12, 1950 |
| 2,738,197 | Stevens | Mar. 13, 1956 |
| 2,878,589 | Mongello | Mar. 24, 1959 |

FOREIGN PATENTS

| | | |
|---|---|---|
| 600,330 | Germany | July 1, 1934 |